(12) United States Patent
Kippel et al.

(10) Patent No.: US 8,163,072 B2
(45) Date of Patent: Apr. 24, 2012

(54) FILTER WASHING SYSTEM FOR GAS TURBINE ENGINES

(75) Inventors: Brad Kippel, Greer, SC (US); Douglas Byrd, Greer, SC (US)

(73) Assignee: General Electric Company, Schenectady, NY (US)

( * ) Notice: Subject to any disclaimer, the term of this patent is extended or adjusted under 35 U.S.C. 154(b) by 181 days.

(21) Appl. No.: 12/426,439

(22) Filed: Apr. 20, 2009

(65) Prior Publication Data
US 2010/0263541 A1    Oct. 21, 2010

(51) Int. Cl.
*B01D 46/04* (2006.01)
(52) U.S. Cl. ............................................ 96/233; 95/281
(58) Field of Classification Search .................... 96/296, 96/233, 228; 95/281, 214; 55/484
See application file for complete search history.

(56) References Cited

U.S. PATENT DOCUMENTS

| | | | | |
|---|---|---|---|---|
| 2,057,579 A | * | 10/1936 | Kurth | 96/233 |
| 2,387,473 A | * | 10/1945 | Spitzka | 96/233 |
| 2,513,174 A | * | 6/1950 | Hess | 95/214 |
| 3,563,474 A | * | 2/1971 | Robinson | 239/561 |
| 3,606,897 A | * | 9/1971 | Tobin, III et al. | 134/86 |
| 4,731,100 A | * | 3/1988 | Loeffelmann et al. | 95/261 |
| 4,926,620 A | * | 5/1990 | Donle | 95/202 |
| 5,358,552 A | * | 10/1994 | Seibert et al. | 95/281 |
| 5,879,552 A | * | 3/1999 | Bradfield | 210/411 |
| 6,149,716 A | * | 11/2000 | Bach et al. | 95/280 |
| 6,368,386 B1 | * | 4/2002 | Nelson et al. | 95/268 |
| 6,716,274 B2 | * | 4/2004 | Gogins et al. | 95/273 |
| 7,008,465 B2 | * | 3/2006 | Graham et al. | 95/78 |
| 2004/0255783 A1 | | 12/2004 | Graham et al. | |
| 2007/0056446 A1 | * | 3/2007 | So | 96/233 |
| 2008/0098890 A1 | * | 5/2008 | Feher | 95/187 |
| 2008/0098891 A1 | * | 5/2008 | Feher et al. | 95/214 |
| 2008/0141636 A1 | | 6/2008 | Singh | |
| 2008/0229927 A1 | * | 9/2008 | Singh et al. | 95/281 |
| 2009/0053040 A1 | * | 2/2009 | Chillar et al. | 415/116 |
| 2009/0199524 A1 | * | 8/2009 | Gillingham et al. | 55/486 |
| 2011/0048228 A1 | * | 3/2011 | Handley et al. | 95/45 |
| 2011/0120312 A1 | * | 5/2011 | Diebold et al. | 95/282 |

FOREIGN PATENT DOCUMENTS

| | | |
|---|---|---|
| DE | 102007059488 A1 | 6/2008 |
| WO | 99/64735 A1 | 12/1999 |
| WO | 01/03808 A1 | 1/2001 |

OTHER PUBLICATIONS

European Search Report and Written Opinion, EP10160379.3, Jul. 14, 2010.
Donaldson, Title: "GDX There is no Substitute for your Challenging Environment", Copyright 2004, 4 pgs.

\* cited by examiner

*Primary Examiner* — Duane Smith
*Assistant Examiner* — Pankti Patel
(74) *Attorney, Agent, or Firm* — Sutherland Asbill & Brennan, LLP

(57) ABSTRACT

A filter system for an air inlet of a gas turbine engine. The filter system may include a number of filters positioned about the air inlet and a water spray system positioned to spray the filters. The filters may include a hydrophobic or an oleophobic filter media.

20 Claims, 2 Drawing Sheets

FILTER WASHING SYSTEM FOR GAS TURBINE ENGINES

TECHNICAL FIELD

The present application relates generally to gas turbine engines and more particularly relates to a filter washing system for use with a gas turbine air inlet and the like.

BACKGROUND OF THE INVENTION

Air entering a turbine compressor inlet and similar devices should be filtered before compression or other use. Impure inlet air laden with dirt, debris, dust particles, salt, and other contaminants may damage the compressor blades, plug cooling passages, and damage other types of power generation equipment via corrosion, erosion, fouling, and the like. Such damage may reduce the life expectancy and the overall performance of the generation equipment. To avoid this problem, the inlet air may pass through one or more filters to remove the contaminants.

The air filters, however, may have a relatively short life span due to accumulation of the dirt, debris, and other types of contaminants. This accumulation also may raise the pressure drop across the filter element. Raising the pressure drop reduces the overall power output and the efficiency of the gas turbine engine. As such, the filter elements typically may be replaced when the pressure drop reaches the point in which the gas turbine operator deems the loss of machine efficiency exceeds the costs of the replacing the filters. Many gas turbine engines may have automatic controls that signal when the filters have reach a predetermined set point and that filter replacement is needed. If the operator does not replace the filters at the alarm point, additional controls may shut the gas turbine engine down to prevent inlet or filter implosion due to high filter element pressure drops. The gas turbine engine typically may be shutdown for the replacement of the filters.

Frequent filter replacement thus may result in high maintenance costs to the gas turbine end user in terms of labor and filters as well as the loss of revenue due to engine downtime and unavailability. Likewise, online replacement of the filters may result in premature wear of the gas turbine internal components.

To date, known self-cleaning inlet air filter elements have relied on a reverse blast of compressed air that creates a shock wave which knocks off the accumulated dirt, debris, and other contaminants off of the filter elements. The dirt and debris located at the top of the filter elements, however, may accumulate and may not be effectively cleaned by the compressed air self cleaning.

There is thus a desire for an improved inlet air filtering systems. Such systems preferably can avoid the accumulation of dirt, debris, and other contaminants without an increased pressure drop therethrough. Overall system efficiency and performance also should be improved.

SUMMARY OF THE INVENTION

The present application thus provides for a filter system for an air inlet of a gas turbine engine. The filter system may include a number of filters positioned about the air inlet and a water spray system positioned to spray the filters. The filters may include a hydrophobic or an oleophobic filter media therein.

The present application further provides for a filter system for an air inlet of a compressor of a gas turbine engine. The filter system may include a number of filters positioned about the air inlet of the compressor and a number of spray nozzles positioned about the filters to spray the filters with water. The filters may include a hydrophobic or an oleophobic filter media therein.

These and other features of the present application will become apparent to one of ordinary skill in the art upon review of the following detailed description when taken in conjunction with the several drawings and the appended claims.

DETAILED DESCRIPTION

Figure 1:
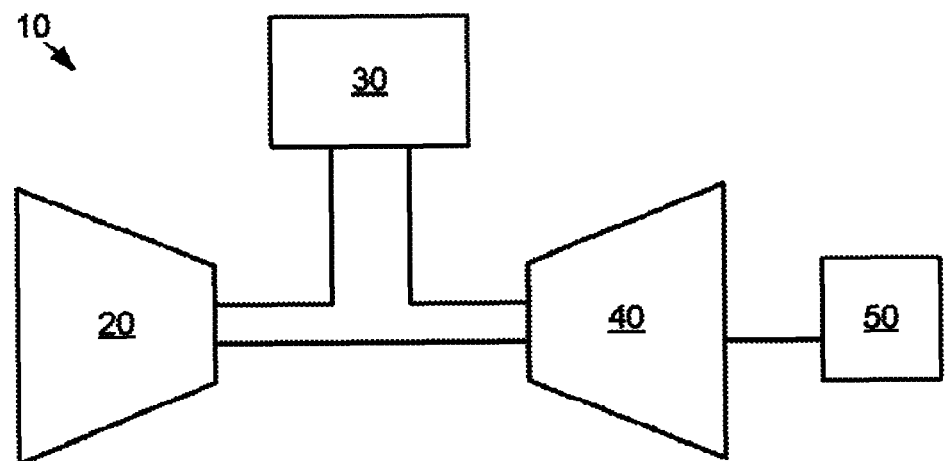
FIG. 1 is a schematic view of a gas turbine engine.

Referring now to the drawings, in which like numbers refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a compressed flow of fuel and ignites the mixture. (Although only a single combustor 30 is shown, the gas turbine engine 10 may include any number of combustors 30). The hot combustion gases are in turn delivered to a turbine 40. The hot combustion gases drive the turbine 40 so as to produce mechanical work. The mechanical work produced in the turbine 40 drives the compressor 20 and an external load 50 such as an electrical generator and the like. The gas turbine engine 10 may use natural gas, various types of syngas, and other types of fuels. The gas turbine engine 10 may have other configurations and may use other types of components. Multiple gas turbine engines 10, other types of turbines, and other types of power generation equipment may be used herein together.

Figure 2:
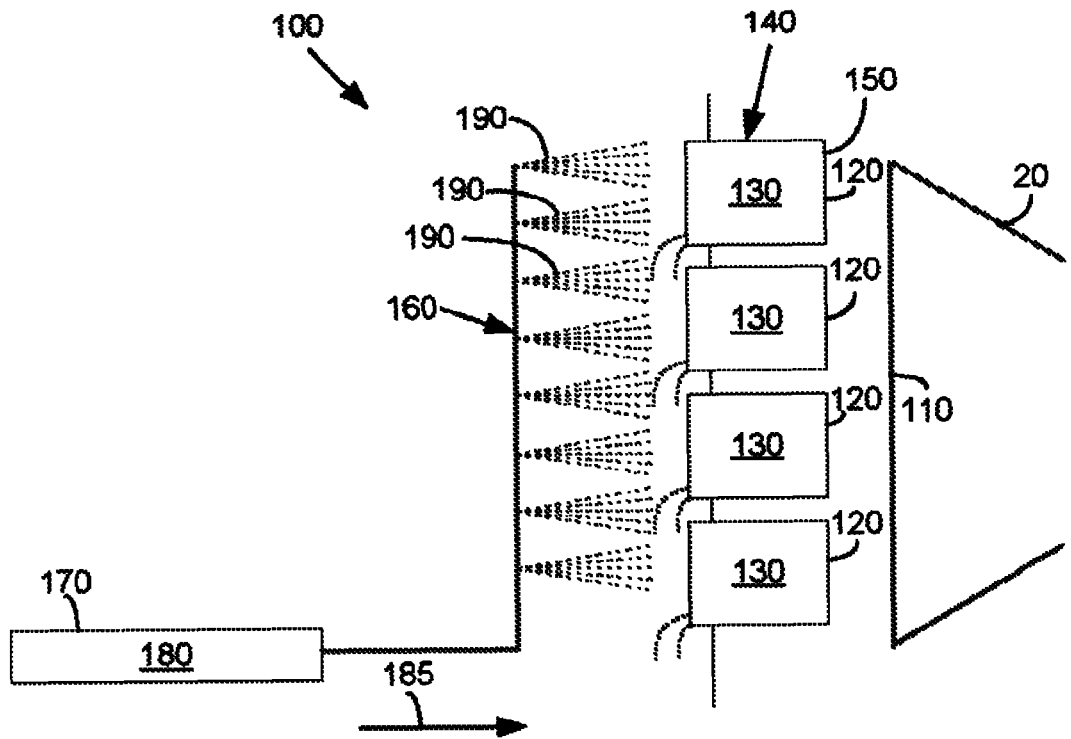
FIG. 2 is a schematic view of an inlet filter system as is described herein.

FIG. 2 shows a schematic view of an inlet air filter system 100 as is described herein. The inlet air filter system 100 may be positioned about an inlet 110 of the compressor 20 or other type of air inlet system.

The inlet air filter system 100 may include a number of filters 120. The filters 120 may include a hydrophobic ("water-fearing") and/or an oleophobic ("oil-fearing") filter media 130 therein. The hydrophobic and/or the oleophobic filter media 130 may include a base media, a membrane, or another type of coating and/or combinations thereof. The filter media 130 may be a web of synthetic fibers. The filter media 130 may be made out of PFTE (Polytetrafluoroethylene), ePFTE (Expanded Polytetrafluoroethylene), and similar types of materials. Examples of filters 120 with a hydrophobic and/or a oleophobic filter media 130 include a F9MH filter sold by General Electric Company of Schenectady, New York, a Duravee HXL 98 Filter sold by AAF International of Louisville, Kentucky, and a D-Salt filter sold by Donaldson Company, Inc. of Minneapolis, Minn., and similar types of filters 120 and hydrophobic or oleophobic filter media 130.

In this example, the filters 120 may be in the form of a grid 140. Each of the filters 120 may be inclined forward to promote drainage. The filters 120 may be static filter elements 150. The filters 120 may be pleated or non-pleated. The filters 120 may include a frame on one or both sides of the filter media 130. The frame may be configured to seal about a permanent structure within the overall filter house or otherwise positioned.

The inlet air filter system 100 also may include a water spray system 160. The water spray system 160 may include a water tank 170. The water tank 170 may have a volume of water 180 therein. The water 180 may be at ambient temperature or the water 180 may be chilled. The water tank 170 may be in communication with any number of spray nozzles 190. The spray nozzles 190 may be located upstream and/or above the filters 120. Other positions may be used herein. Any number of spray nozzles 190 may be used.

In use, the filters 120 of the inlet air filter system 100 may keep dirt, debris, and other types of contaminants from the inlet 110 of the compressor 20. The filters 120 accumulate the dirt, debris, and other contaminants thereon. The inlet air filter system 100 also may use the water spray system 160 to clean the filters 120. Specifically, the filters 120 with the hydrophobic or oleophobic filter media 130 may be self cleaned via the water 180 from the spray nozzles 190. The water spray will remove the accumulated dirt, debris, and other contaminants from the filters 120 while the use of the hydrophobic or oleophobic filter media 130 prevents the water with the dirt, debris, and other contaminants from passing therethrough.

Use of the inlet air filter system 100 with the water spray system 160 also may have the further benefit of providing power augmentation to the gas turbine engine 10. Specifically, the water 180 may cool an inlet air stream 185 via evaporative cooling from the water spray system 160, in which case cooling may be via evaporative cooling and/or chilling. Likewise, the water 180 may be chilled when used with the water spray system 160. When providing power augmentation, the spray of water 180 may be substantially continuous such that the cleaning may be continuous and may provide a more thorough cleaning.

The use of the hydrophobic or the oleophobic filter media 130 allows the sequence of equipment (the filters 120 and the water spray system 160) to be reversed from what has been traditionally provided. Because the water spray system 160 is now upstream of a hydrophobic or an oleophobic membrane filter material 130, pure water does not have to be used therein. Rather, the oleophobic filter material 130 allows for a broader range of impurities due to the nature of the filter material 130 in preventing lower surface tension solutions from passing therethough.

The inlet air filter system 100 thus may increase the life of the filters 120 by removing accumulated dirt, debris, and contaminants therefrom. The inlet air filter system 100 also may prevent a decrease in the overall output of the gas turbine engine 10 by keeping the filters 120 clean of dirt, debris, and contaminants so as to keep the inlet pressure drop relatively low. The inlet air filter system 100 also may provide power augmentation to the overall gas turbine engine 10 by cooling the inlet air stream 185 by providing either evaporative cooling or chilling. Overall maintenance costs may be decreased by increasing the life of the filter 120. Likewise, the availability of the gas turbine engine 10 may be increased by increasing the life of the filters 120. The inlet air filter system 100 is easily retrofitable in existing gas turbine engines 10. By avoiding the known compressed air reverse flow self-cleaning filters described above, the inlet air filter system also has an acoustical benefit over these known systems.

Figure 3:
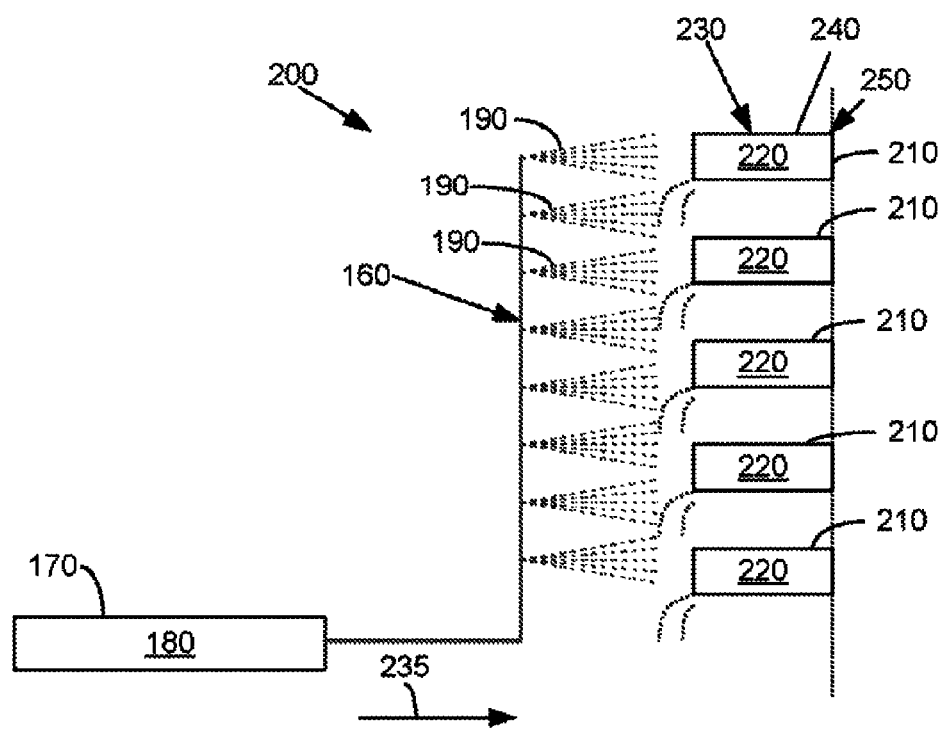
FIG. 3 is a schematic view of an alternative embodiment of the inlet air filter system as is described herein.

The inlet air filter system 100 may have many different geometries. For example, FIG. 3 shows an alterative embodiment of an inlet air filter system 200. The inlet air filter system 200 also may include a number of filters 210 with a hydrophobic or an oleophobic filter media 220 therein. In this embodiment, the filters 210 may take the form of canister type filters 230 in a cross flow arrangement 235. These canister filters 210 may be pulse self-cleaning filters 240 or static filters. As opposed to the static filter elements 150, the pulsed self-cleaning filter elements 240 may use a pulse of air to aid in cleaning the filters 210 as described above. A canister-type filter is available from Donaldson Company, Inc. of Minneapolis, Minn. and sold under the mark "GDX" or "GDS". Similar configurations maybe used herein.

Figure 4:
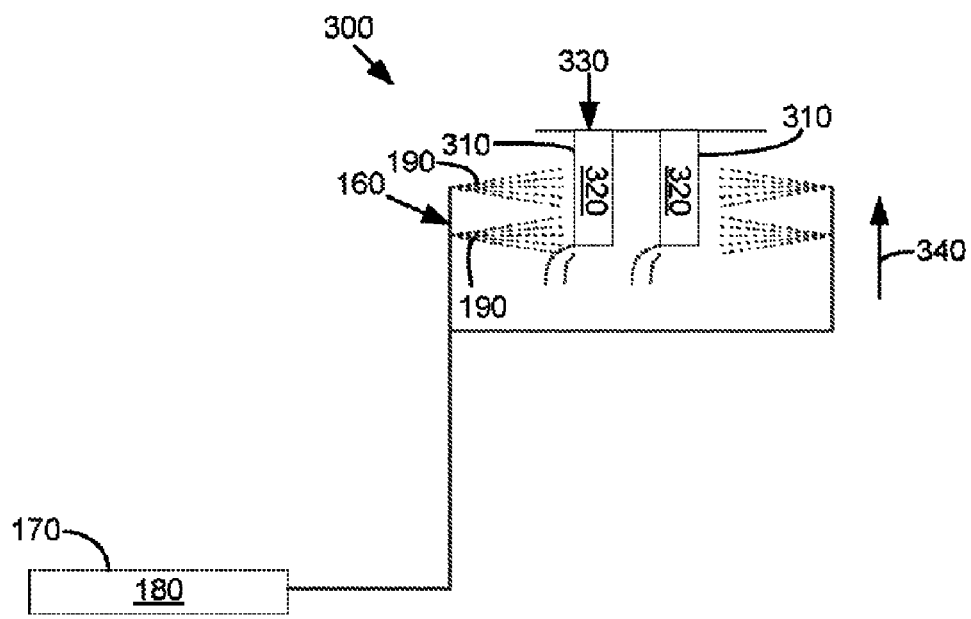
FIG. 4 is a schematic view of an alternative embodiment of the inlet air filter system as is described herein.

Likewise, FIG. 4 shows a further embodiment of an air inlet filter system 300. The inlet air filter system also uses a number of filters 310 with a hydrophobic or an oleophobic filter media 320 therein. These filters 310 also may be in the form of a canister 330. In this embodiment, the filters may have an up flow position 340. Similar configurations may be used herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A filter system for an air inlet of a gas turbine engine, comprising:
   a plurality of filters positioned about the air inlet;
   the plurality of filters comprising a hydrophobic or an oleophobic filter media; and
   a water spray system positioned upstream of the plurality of filters to spray directly an outer surface of the plurality of filters to reduce contaminates thereon and to provide power augmentation to the gas turbine engine.

2. The filter system of claim 1, wherein the air inlet comprises a compressor air inlet.

3. The filter system of claim 1, wherein the hydrophobic or the oleophobic filter media comprises polytetrafluoroethylene or expanded polytetrafluoroethylene.

4. The filter system of claim 1, wherein the plurality of filters comprises a grid.

5. The filter system of claim 1, wherein the plurality of filters comprises a plurality of static filters.

6. The filter system of claim 1, wherein the plurality of filters comprises a plurality of canister filters.

7. The filter system of claim 1, wherein the plurality of filters comprises a plurality of pulsed filters.

8. The filter system of claim 1, wherein the water spray system comprises a water tank.

9. The filter system of claim 8, where the water tank comprises chilled water therein.

10. The filter system of claim 8, where the water tank comprises ambient water therein.

11. The filter system of claim 1, wherein the water spray system comprises a plurality of spray nozzles.

12. The filter system of claim 11, wherein the plurality of spray nozzles comprises a cross flow position.

13. The filter system of claim 11, wherein the plurality of spray nozzles comprises an up flow position.

14. A filter system for an air inlet of a compressor of a gas turbine engine, comprising:
   a plurality of filters positioned about the air inlet of the compressor;
   the plurality of filters comprising a hydrophobic or an oleophobic filter media; and
   a plurality of spray nozzles positioned upstream of the plurality of filters about the filters to spray directly an outer surface of the plurality of filters with water to reduce contaminates thereon and to provide power augmentation to the gas turbine engine.

15. The filter system of claim 14, wherein the hydrophobic or the oleophobic filter media comprises polytetrafluoroethylene or expanded polytetrafluoroethylene.

16. The filter system of claim 14, wherein the plurality of filters comprises a grid.

17. The filter system of claim 14, wherein the plurality of filters comprises a plurality of static filters.

18. The filter system of claim 14, wherein the plurality of filters comprises a plurality of canister filters.

19. The filter system of claim 14, wherein the plurality of filters comprises a plurality of pulsed filters.

20. The filter system of claim 14, where the plurality of spray nozzles spay chilled water.

* * * * *